United States Patent [19]
Anderson et al.

[11] 3,817,998
[45] June 18, 1974

[54] 2-AMINO AND SUBSTITUTED AMINO-4, 6-DIAMINO-5-PYRIMIDINESULFONAMIDES

[75] Inventors: Paul L. Anderson, Dover; Robert E. Manning, Mountain Lakes, both of N.J.

[73] Assignee: Sandoz-Wander, Inc., Hanover, N.J.

[22] Filed: Dec. 6, 1971

[21] Appl. No.: 205,323

Related U.S. Application Data

[63] Continuation-in-part of Ser. No. 193,555, Oct. 28, 1971, abandoned, which is a continuation-in-part of Ser. No. 108,221, Jan. 20, 1971, abandoned.

[52] U.S. Cl.......... 260/247.1, 260/256.5 R, 424/248
[51] Int. Cl.............................................. C07d 87/46
[58] Field of Search................... 260/247.1, 256.5 R

*Primary Examiner*—Donald G. Daus
*Assistant Examiner*—Jose Tovar

[57] ABSTRACT

2-Amino and substituted amino-4,6-diamino-5-pyrimidinesulfonamides, e.g., 4,6-diamino-2-methylamino-5-pyrimidinesulfonamide, are prepared by treating 4,6-diamino-2-methylsulfonyl-5-pyrimidinesulfonamide with ammonia or substituted amines and are useful as anti-hypertensives.

2 Claims, No Drawings

2-AMINO AND SUBSTITUTED AMINO-4, 6-DIAMINO-5-PYRIMIDINESULFONAMIDES

This application is a continuation-in-part of our copending application Ser. No. 193,555 filed Oct. 28, 1971 which in turn is a continuation-in-part of copending application Ser. No. 108,221, filed Jan. 20, 1971 both now abandoned.

This invention relates to amino substituted-5-pyrimidinesulfonamides, their preparation and their use as hypotensive/anti-hypertensive agents.

The compounds of this invention may be represented by the following formula:

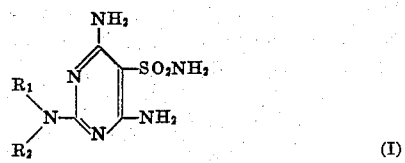

where
$R_1$ and $R_2$ each independently represent hydrogen; alkyl having 1 to 8 carbon atoms, e.g., methyl, ethyl, propyl, octyl, and the like; lower alkenyl, i.e., alkenyl having 3 to 5 carbon atoms, e.g., allyl, methallyl and the like; phenyl or
$R_1$ and $R_2$ together with N represent

where
Z is —O— or N-$R_3$ and
$R_3$ represents hydrogen, lower alkyl, i.e., alkyl having 1 to 4 carbon atoms, e.g. methyl, ethyl, propyl and the like; ω-hydroxy lower alkyl, i.e., ω-hydroxy lower alkyl having 2 to 4 carbon atoms, e.g., β-hydroxyethyl, γ-hydroxypropyl and the like; or lower alkanoyl, i.e., alkanoyl having 2 to 4 carbon atoms, e.g., acetyl, propionyl and the like, or pharmaceutically acceptable acid addition salts thereof.

The compounds of formula (I) are prepared in accordance with the following reaction scheme:

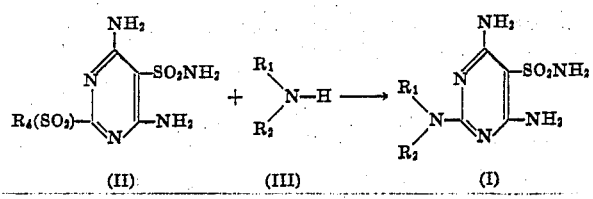

where
$R_4$ is lower alkyl as defined above and
$R_1$ and $R_2$ are as set out previously.

The compounds of formula (I) are prepared by treating a 4,6-diamino-2-alkylsulfonyl-5-pyrimidinesulfonamide of formula (II) with an amine of formula (III). Although it is not necessary that the reaction be carried out in a solvent, it is preferred that an inert hydroxylic solvent such as water or lower alkanol or, where feasible, an excess of amine (III) be used. The temperature at which the reaction is run is not critical although it is preferred that temperatures between room temperature adn the and temperature of the reaction medium be used. The product is recovered by conventional means, e.g., evaporation.

Many of the compounds of formula (II) and (III) are known and can be prepared by methods disclosed in the literature. The compounds of formula (II) and (III) not specifically disclosed in the literature can be prepared by analogous methods from known starting materials.

The compounds of formula (I) are useful because they possess pharmacological activity in animals. In particular, the compounds are useful as hypotensive/anti-hypertensive agents, as indicated by their activity in renal hypertensive rats given 100 mg/kg of active compound using the techniques of A. Grollman (Proc. Soc. Exptl. Biol. and Med. 57:102, 1944) and indirectly measuring the blood pressure from the caudal artery in the tail using a pneumatic pulse transducer.

When so utilized, the compounds may be combined with one or more pharmaceutically acceptable carriers or adjuvants. They may be administered orally or parenterally and, depending upon the compound employed and the mode of administration, the exact dosage utilized may vary.

Furthermore, the compounds (I) may be similarly administered in the form of their non-toxic pharmaceutically acceptable acid addition salts. Such salts possess the same order of activity as the free base, are readily prepared by reacting the base with an appropriate acid and accordingly, are included within the scope of the invention. Representative of such salts are the mineral acid salts, such as the hydrochloride, hydrobromide, sulfate, phosphate and the like and the organic acid salts, such as the succinate, benzoate, acetate, p-toluenesulfonate, benzenesulfonate, and the like.

In general, satisfactory results are obtained when these compounds are administered as a hypotensive/anti-hypertensive agent at a daily dosage of about 1.0 milligrams to about 200 milligrams per kilogram of animal body weight. This daily dosage is preferably administered 2 to 4 times a day, or in sustained release form. For most large mammals, such as primates, the total daily dosage is from about 70 milligrams to about 750 milligrams. Dosage forms suitable for internal use comprise from about 17.5 milligrams to about 375 milligrams of the active compound in intimate admixture with a solid or liquid pharmaceutically acceptable carrier or diluent.

A representative formulation suitable for oral administration is a capsule prepared by standard encapsulating techniques which contain the following:

| Ingredients | Weight (mg.) |
|---|---|
| 4,6-diamino-2-methylamino-5-pyrimidinesulfonamide | 50 |
| Inert solid diluent (starch, lactose, kaolin) | 250 |

EXAMPLE 1

4,6-diamino-2-methylamino-5-pyrimidinesulfonamide

Into 12.0 g of 4,6-diamino-2-methylsulfonyl-5-pyrimidinesulfonamide suspended in 1900 ml of methanol is bubbled gaseous methylamine for 2 hours. The mixture is stirred at room temperature for an additional 15 hours and then evaporated to dryness. The crude product is triturated in 35 ml of methanol, after which it is filtered and dried. Recrystallization from methanol yields the product, 4,6-diamino-2-methylamino-5-pyrimidinesulfonamide, mp 199° – 201°C.

When ammonia, diethylamine, diallylamine or aniline is used in place of methylamine in the process of this example, there is obtained 2,4,6-triamino-5-pyrimidinesulfonamide, 4,6-diamino-2-diethylamino-5-pyrimidinesulfonamide; 4,6-diamino-2-diallylamino-5-pyrimidinesulfonamide or 4,6-diamino-2-anilino-5-pyrimidinesulfonamide, respectively.

EXAMPLE 2

4,6-diamino-2-morpholino-5-pyrimidinesulfonamide

To 3.6 g of 4,6-diamino-2-methylsulfonyl5-pyrimidinesulfonamide suspended in 100 ml of water is added 4.1 g of morpholine. The mixture is stirred for 1 hour at reflux temperature, and thereafter stirred for an additional 17 hours at room temperature. The solution is then filtered and dried to yield the product, 4,6-diamino-2-morpholino-5-pyrimidinesulfonamide; mp 233° C. (decomposition).

Following the above procedure but using piperazine, N-methylpiperazine, N-($\beta$-hydroxyethyl)-piperazine or N-acetyl-piperazine in place of the morpholine used therein, there is obtained 4,6-diamino-2-piperazino-5-pyrimidinesulfonamide; 4,6-diamino-2-(N-methylpiperazino)-5-pyrimidinesulfonamide; 4,6-diamino-2-(N-[$\beta$-hydroxyethyl]-piperazino)-5-pyrimidinesulfonamide or 4,6-diamino-2-(N-acetylpiperazino)-5-pyrimidinesulfonamide, respectively.

The above 4,6-diamino-2-morpholino-5-pyrimidinesulfonamide is dissolved in methanol, and hydrogen chloride gas is bubbled through the solution for ½ hour at room temperature, yielding as the product 4,6-diamino-2-morpholino-5-pyrimidinesulfonamide hydrochloride (mp 235°–240°).

What is claimed is:
1. The compound which is 4,6-diamino-2-methylamino-5-pyrimidinesulfonamide.
2. The compound which is 4,6-diamino-2-morpholino-5-pyrimidinesulfonamide.

* * * * *